US012114143B2

(12) United States Patent
Li et al.

(10) Patent No.: US 12,114,143 B2
(45) Date of Patent: Oct. 8, 2024

(54) REINFORCING PART FOR DIAPHRAGM OF SPEAKER, THE DIAPHRAGM AND THE SPEAKER

(71) Applicant: Goertek Inc., Shandong (CN)

(72) Inventors: Yong Li, Shandong (CN); Cuili Zhang, Shandong (CN)

(73) Assignee: Goertek Inc., Shandong (CN)

( * ) Notice: Subject to any disclaimer, the term of this patent is extended or adjusted under 35 U.S.C. 154(b) by 155 days.

(21) Appl. No.: 17/292,535

(22) PCT Filed: Dec. 20, 2018

(86) PCT No.: PCT/CN2018/122340
§ 371 (c)(1),
(2) Date: Oct. 24, 2022

(87) PCT Pub. No.: WO2020/093550
PCT Pub. Date: May 14, 2020

(65) Prior Publication Data

US 2024/0056736 A1 Feb. 15, 2024

(30) Foreign Application Priority Data

Nov. 9, 2018 (CN) ......................... 201811331637.3

(51) Int. Cl.
*H04R 7/06* (2006.01)

(52) U.S. Cl.
CPC ..................................... *H04R 7/06* (2013.01)

(58) Field of Classification Search
CPC ................................................. H04R 7/06–10
See application file for complete search history.

(56) References Cited

U.S. PATENT DOCUMENTS

2001/0048256 A1* 12/2001 Miyazaki ................ H04R 7/04 310/81

FOREIGN PATENT DOCUMENTS

| | | | | |
|---|---|---|---|---|
| CN | 103221896 A | | 7/2013 | |
| CN | 203851283 U | | 9/2014 | |
| CN | 104553105 A | * | 4/2015 | ............ B32B 15/04 |

* cited by examiner

*Primary Examiner* — Mark Fischer
(74) *Attorney, Agent, or Firm* — Baker Botts LLP

(57) ABSTRACT

The present disclosure provides a reinforcing part for a speaker diaphragm, the reinforcing part being an overlapped multilayer structure, the reinforcing part includes a heat dissipation layer as well as a first support layer and a second support layer that are fixed and bonded on surfaces of two sides of the heat dissipation layer respectively, and the first support layer and the second support layer each includes through holes penetrating the surfaces of two sides thereof, and the reinforcing part further includes fillers located within the through holes and configured for heat conduction, the fillers having thermal conductivity higher than that of the support layers.

9 Claims, 2 Drawing Sheets

REINFORCING PART FOR DIAPHRAGM OF SPEAKER, THE DIAPHRAGM AND THE SPEAKER

CROSS-REFERENCE TO RELATED APPLICATIONS

This application is a National Stage of International Application No. PCT/CN2018/122340, filed on Dec. 20, 2018, which claims priority to Chinese Patent Application No. 201811331637.3, filed on Nov. 9, 2018, both of which are hereby incorporated by reference in their entireties.

TECHNICAL FIELD

The present disclosure relates to the field of electro-acoustic technology. More specifically, it relates to a reinforcing part structure for a diaphragm, as well as the diaphragm and the speaker to which the reinforcing part structure is applied.

BACKGROUND

A speaker, as a component which can convert electrical energy into sound, is widely used in electronic terminal devices such as mobile phones, tablet computers, notebooks, and PDAs. A speaker structure typically includes a magnetic circuit system, a vibration system and an auxiliary system, wherein the vibration system essentially includes a diaphragm and a voice coil. When the speaker is in operation, the voice coil generates a lot of heat which cannot be easily dissipated to the outside, since the voice coil is located within a rear sound cavity of the speaker which is relatively closed.

Since a front acoustic cavity of the speaker is in communication with the outside through sound holes, a prior t speaker is typically provided with a reinforcing part (a DOME, also called an overlapping part) on the diaphragm, in order to enhance the performance of the high-frequency position of the product. Therefore, through the reinforcing part structure, the heat generated by the voice coil may be conducted from the rear acoustic cavity to the front acoustic cavity, and in turn the heat is dissipated to the outside through the air flow between the front acoustic cavity and the outside, thereby realizing heat dissipation from the speaker.

A prior art reinforcing part structure is typically made of a resin composite material, a metal material, or a composite material of metal and resin; however, such a reinforcing part structure has a low thermal conductivity and a poor heat conduction performance, and thus cannot meet the heat dissipation requirements of a micro speaker. Therefore, there is a need to provide a new reinforcing part structure with an excellent performance of heat conduction.

SUMMARY

An objective of the present invention is to provide a reinforcing part structure with a high thermal conductivity.

According to an aspect of the present invention, a reinforcing part for a speaker diaphragm is provided, the reinforcing part being an overlapped multilayer structure, the reinforcing part includes a heat dissipation layer as well as a first support layer and a second support layer that are fixed and bonded on surfaces of two sides of the heat dissipation layer respectively, the first support layer and the second support layer each includes through holes penetrating surfaces of two sides thereof, and the reinforcing part further includes fillers located within the through holes and configured for heat conduction, the fillers having thermal conductivity higher than that of the support layers.

Preferably, sidewall surfaces of the fillers are bonded and fixed to inner walls of the through holes by adhering.

Preferably, sidewall surfaces of the fillers are fitted and fixed to inner walls of the through holes by interference fit.

Preferably, the first support layer and the second support layer each includes a plurality of through holes penetrating surfaces of two sides thereof, and the plurality of through holes are evenly distributed on the first support layer and the second layer.

Preferably, the through holes have cross-sectional shapes which are circular, elliptical or rectangular.

Preferably, the heat dissipation layer has a thermal conductivity greater than that of the first support layer and the second support layer.

Preferably, the first support layer and the second support layer are made of carbon fiber, resin or steel, the fillers are made of graphene, copper or aluminum, and the heat dissipation layer is made of graphene, copper or aluminum.

Preferably, the heat dissipation layer and the fillers are made of the same material or different materials; wherein, the fillers in the through holes of the first support layer and those of the second support layer are made of the same material or different materials.

According to another aspect of the present application, a diaphragm is provided, which includes a fixing part, a corrugated rim integral with the fixing part, a central part located within the corrugated rim, and the above-mentioned reinforcing part bonded and fixed to a surface of the central part.

According to another yet aspect of the present application, a speaker is provided, which includes the above-mentioned diaphragm.

The beneficial effects provided by the present invention are as follows:

The reinforcing part of the present invention improves the heat conduction capability between surfaces of two sides of the reinforcing part by providing through holes on the first support layer and the second support surface and providing heat-conducting fillers within the through holes. In a speaker adopting such a reinforcing part structure, heat may be quickly conducted from a rear acoustic cavity to a front acoustic cavity, and may be dissipated outward through the air flow between the front acoustic cavity and the outside, thereby realizing quick heat dissipation from the speaker.

BRIEF DESCRIPTION OF THE DRAWINGS

The specific implementations of the present invention are described below in further detail with reference to the accompanying drawings.

DETAILED DESCRIPTION

To explain the present invention more clearly, the present invention is further described below with reference to preferred embodiments and the accompanying drawings. Similar components are denoted with same reference numbers in the figures. Those skilled in the art should understand that content specifically described below is illustrative rather than restrictive, and should not limit the protection scope of the present invention.

Figure 1:
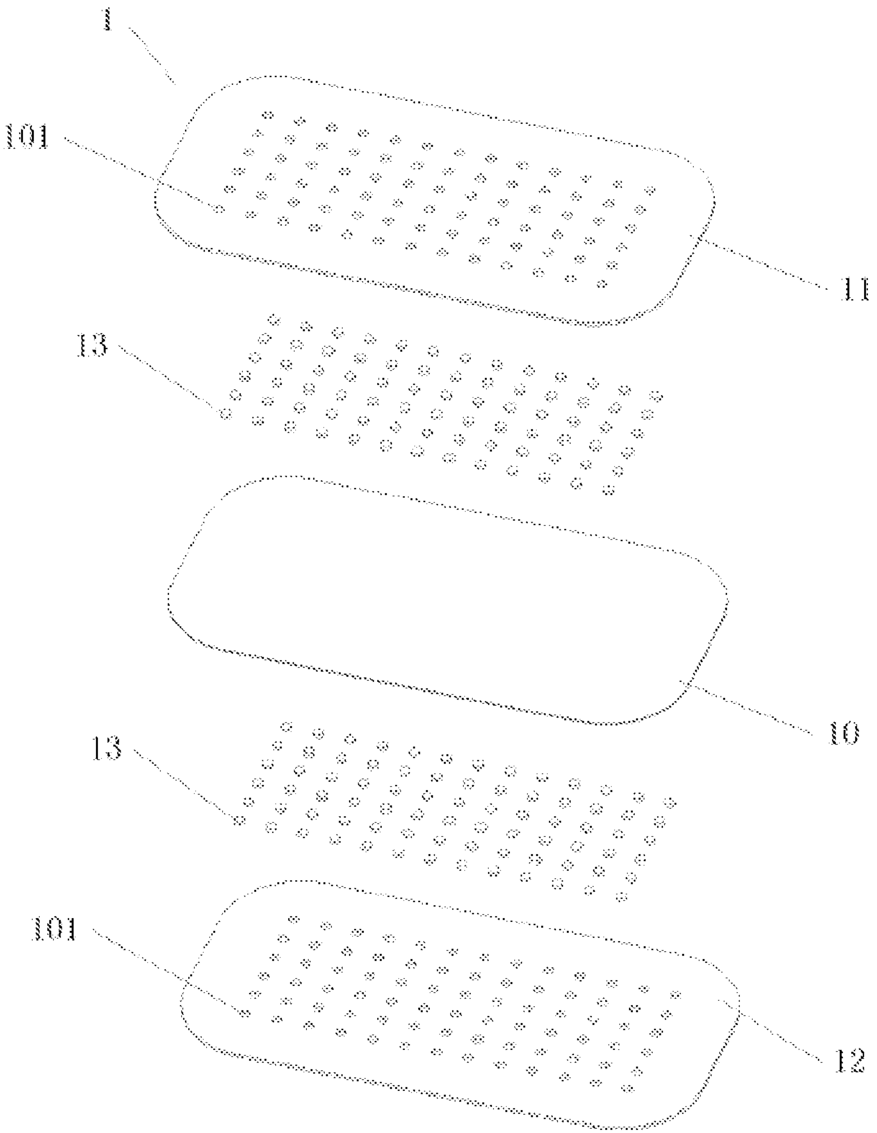
FIG. 1 shows an exploded schematic structure diagram of a reinforcing part according to the present invention.

As shown in FIG. 1, the present invention provides a reinforcing part 1 for a diaphragm, wherein the shape of the reinforcing part is not limited and depends on practical application, such as circular, rectangular, elliptical, etc.; the reinforcing part 1 is made into the shape of a plate, a sphere, etc. according to practical needs, and is overlapped on the diaphragm for direct use. The reinforcing part 1 includes a heat dissipation layer 10 as well as a first support layer 11 and a second support layer 12 that are fixed and bonded to surfaces of two sides of the heat dissipation layer 10 respectively, wherein the first support layer 11 and the second support layer 12 are made of material selected from one of metal material, resin material or carbon fiber material, and then made into thin plate through the corresponding process selected according to the respectively selected material. The dissipation layer 10 may be made of a material selected from one of graphene, copper or aluminum, then be made into a thin plate according to the respectively selected material, and then fixedly connected to surfaces of two sides thereof with the first support layer 11 and the second support layer 12, so that the reinforcing part 1 is formed into an overlapped three-layer structure. The first support layer 11 and the second support layer 12 may be selected from the same material or different materials, and have the conductivity smaller than that of the heat dissipation layer 10. Specifically, in this embodiment, the first support layer 11 is made of steel, the heat dissipation layer 10 is made of copper, and the second support layer 12 is made of polyimide. Since the rigidity of the steel sheet and polyimide is greater than that of the copper sheet, the copper sheet and polyimide on both sides may serve as support. The heat dissipation layer 14 may be fixedly connected to the first support layer 11 and the second support layer 12 by adhering.

The thermal conductivity of the first support layer 11 and the second support layer 12 located on both sides of the heat dissipation layer 10 are smaller than that of the heat dissipation layer 10. In order to improve the heat transfer efficiency between the surfaces of two sides of the reinforcing part 1 of the present invention, each of the first support layer 11 and the second support layer 12 of the present invention includes through holes 101 penetrating the surfaces of two sides thereof, and fillers 13 provided in through holes 101 and having a thermal conductivity greater than that of the first support layer 11 and the second support layer 12. The through holes 101 are located in the area covered by the heat dissipation layer 10, and one end of each filler 13 is fitted to the heat dissipation layer 10. Since the thermal conductivity of the fillers 13 is greater than that of the first support layer 11 and the second support layer 12, such structure may improve the heat conduction between the first support layer 11 and the second support layer 12, thereby improving overall heat conduction capability of the reinforcing part of the overlapped-layer structure.

Further, the fillers 13 may be made of a material selected from one of graphene, copper or aluminum and being the same as or different from that of the heat dissipation layer 10, and may be in a form of powder or other solid shapes. In this embodiment, the fillers 13 are copper particles, which are located in the through holes 101 and whose one end is fitted and fixed to the heat dissipation layer 10. The fillers in the through holes of the first support layer and the second support layer have the same or different material.

The outer side surfaces of the fillers 13 and the inner walls of the through holes 101 are fitted to each other. Preferably, sidewall surfaces of the fillers 13 are fixedly connected to inner walls of the through holes 101 by adhering; or the sidewall surfaces of the fillers 13 are fitted and fixed to the inner walls of the through holes 101 by interference fit. Such structure enhances the connection strength between the fillers 13 and the support layer 10, thereby improving the reliability of the reinforcing part 1.

In another embodiment, the fillers 13 is in a powder form. In order to increase the connection strength between the powdered fillers 13 and the through holes 101, an adhesive may be mixed in the fillers 13, thus the fillers 13 are fixedly connected to the through holes 101.

Further, the first support layer 11 and the second support layer 12 each includes a plurality of through holes 101 penetrating through the surfaces on the two sides thereof, and the plurality of through holes 101 are evenly distributed on the surfaces of the first support layer 11 and the second support layer 12. Each through hole is located within the area covered by the heat dissipation layer 10, and each through hole 101 is provided with a filler 13 inside, so as to further improve the heat conduction capability between the first support layer 11 and the second support layer 12.

The cross-sectional shapes of the through holes 101 may be circular, elliptical or rectangular, and may be selected by those skilled in the art according to practical needs.

Figure 2:
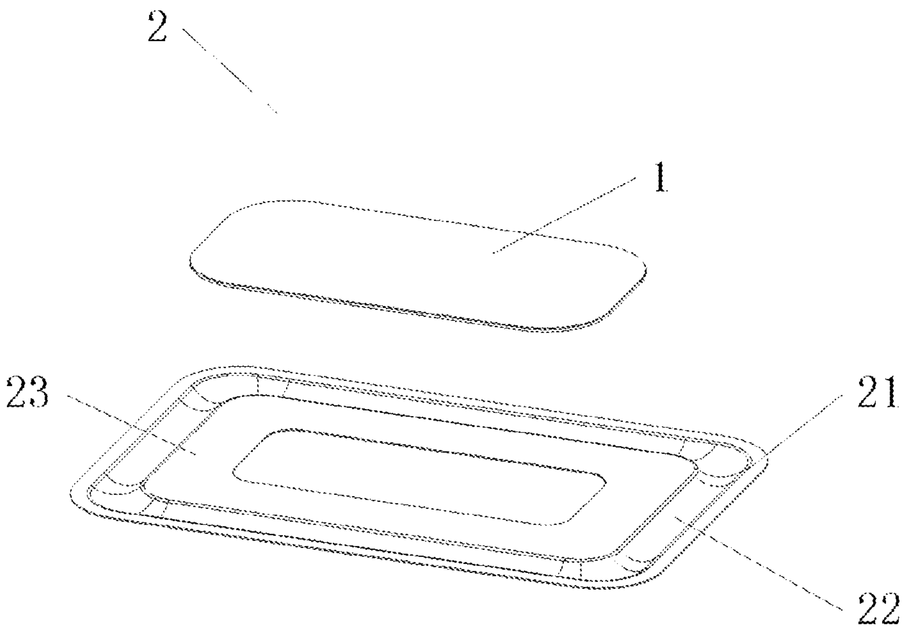
FIG. 2 shows an exploded schematic structure diagram of a diaphragm according to the present invention.
Figure 3:
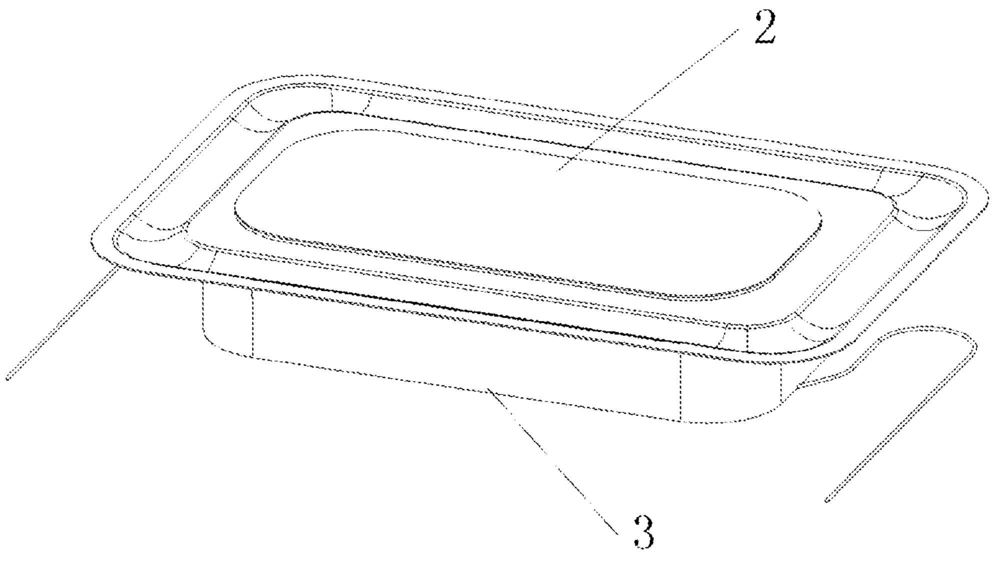
FIG. 3 shows an exploded schematic structure diagram of a vibration system of a speaker according to the present invention.

As shown in FIG. 2, the invention further provides a diaphragm 2, the diaphragm 2 comprising a fixing part 21 being fixed to the sound generator housing, a corrugated rim 22 being integral with the fixing part 21, a central part 23 located within the corrugated rim 22, and a reinforcing part being bonded and fixed to the central part 23. The central part 23 is a hollowed-out structure, and the reinforcing part 1 is fixed and bonded to the hollowed-out part. Since the reinforcing part 1 is the aforementioned structure, it has a high heat conduction capability between the first support layer 11 and the second support layer 12, thereby is approving the heat conduction capability between the two sides of the diaphragm.

The present invention also provides a speaker. The speaker includes a magnetic circuit system and a vibration system in cooperation with the magnetic circuit system. The vibration system includes the above-mentioned diaphragm 2 and a voice coil 3 fixed and bonded to one side of the diaphragm 2. In the speaker of the present invention, the heat generated by the voice coil 3 is conducted from the rear acoustic cavity to the front acoustic cavity by the diaphragm 2, and in turn is dissipated outward through the air flow from the front acoustic cavity to the outside. Since the diaphragm 2 has a strong heat conduction capability and may quickly dissipate the heat from the speaker, as such, the speaker of the present invention has good heat dissipation capability and thereby improved operation reliability.

Obviously, the above-mentioned embodiments of the present invention are merely examples for clear illustration of the present invention, and are not meant to limit the implementation of the present invention. For those of ordinary skill in the art, other changes or modifications may be made in various manners based on the foregoing description. Although it is not possible to list all the implementations here, any obvious changes or modifications derived from the technical solutions of the present invention still fall within the protection scope of the present invention.

The invention claimed is:

1. A reinforcing part for a speaker diaphragm, having an overlapped multilayer structure, wherein the reinforcing part comprises a heat dissipation layer as well as a first support layer and a second support layer that are fixed and bonded on surfaces of two sides of the heat dissipation layer respectively, the first support layer and the second support layer each comprises a plurality of through holes penetrating surfaces of two sides thereof, and the reinforcing part further comprises a plurality of fillers, each located within one of the through holes and configured for heat conduction, the fillers having thermal conductivity higher than that of the support layers.

2. The reinforcing part for a speaker diaphragm of claim 1, wherein each of the fillers includes a sidewall surface bonded and fixed to an inner wall of a corresponding through hole by an adhering.

3. The reinforcing part for a speaker diaphragm of claim 1, wherein each of the fillers includes a sidewall surface fitted and fixed to an inner wall of a corresponding through hole by an interference fit.

4. The reinforcing part for a speaker diaphragm of claim 1, wherein the first support layer and the second support layer each comprises a plurality of through holes penetrating surfaces of two sides thereof, and the plurality of through holes are evenly distributed on the first support layer and the second layer.

5. The reinforcing part for a speaker diaphragm of claim 1, wherein the plurality of through holes have cross-sectional shapes which are circular, elliptical or rectangular.

6. The reinforcing part for a speaker diaphragm of claim 1, wherein the heat dissipation layer has a thermal conductivity greater than that of the first support layer and the second support layer.

7. The reinforcing part for a speaker diaphragm of claim 1, wherein the first support layer and the second support layer are made of carbon fiber, resin or steel, the fillers are made of graphene, copper or aluminum, and the heat dissipation layer is made of graphene, copper or aluminum.

8. The reinforcing part for a speaker diaphragm of claim 1, wherein the heat dissipation layer and the plurality of fillers are made of the same material or different materials; wherein, the plurality of fillers in first support layer and the plurality of fillers in second support layer are made of the same material or different materials.

9. A diaphragm, comprising a fixing part, a corrugated rim integral with the fixing part, a central part located within the corrugated rim, and the reinforcing part for the speaker diaphragm according to claim 1, the reinforcing part being bonded and fixed to a surface of the central part.

* * * * *